(12) United States Patent
Riggs

(10) Patent No.: US 6,612,843 B1
(45) Date of Patent: Sep. 2, 2003

(54) GLOBE BASE EDUCATIONAL DEVICE

(76) Inventor: Douglas M. Riggs, 505 Division, Union City, MI (US) 49094

( * ) Notice: Subject to any disclaimer, the term of this patent is extended or adjusted under 35 U.S.C. 154(b) by 0 days.

(21) Appl. No.: 10/056,305

(22) Filed: Jan. 23, 2002

(51) Int. Cl.[7] ............................................. G09B 27/08
(52) U.S. Cl. ..................... 434/131; 434/135; 434/142; 434/143; 434/149
(58) Field of Search ................................ 434/130–153; 368/21

(56) References Cited

U.S. PATENT DOCUMENTS

| | | | | |
|---|---|---|---|---|
| 4,098 A | * | 7/1845 | Cornell | 434/131 |
| 4,194,306 A | * | 3/1980 | Rogers | 434/285 |
| 4,761,138 A | * | 8/1988 | Niesyn | 434/143 |
| 5,132,943 A | * | 7/1992 | Davies | 368/21 |
| 5,379,271 A | * | 1/1995 | Moedt | 368/24 |

* cited by examiner

*Primary Examiner*—Derris H. Banks
*Assistant Examiner*—Dmitry Suhol

(57) ABSTRACT

The present invention comprises an educational device for use with an earth globe having ecliptic angle of inclination for teaching students the position of the earth relative to the sun through the various seasons. The educational device can also be used to teach the months of the year as well as teaching the causes of night and day. The educational device having a flat board, which represents the earth's orbital plane, and having a sun label, a plurality of season labels and a plurality of month labels affixed on the facade of the board. The educational device also has a indexer wheel pivotally mounted to the board for rotatably mounting the earth globe so that the student may be able to freely rotatably maneuver the earth globe relative to the season labels so that the student can visually grasp the causes of the seasons as the year proceeds.

12 Claims, 8 Drawing Sheets

GLOBE BASE EDUCATIONAL DEVICE

FIELD OF THE INVENTION

The present invention relates to educational devices, and more particular to a device for visually facilitating the explanation to students the causes of the seasons as well as the monthly and daily progression of the earth relative to the sun.

DESCRIPTION OF THE PRIOR ART

Since the days of Copernicus and Galileo, teachers have struggled with ways to explain to students the interrelationship between the sun and the earth. Even in modem times, basic misconceptions remain about the workings of the alignment of the earth relative to the sun to explain the causes of the seasons and even to explain the times of day. Earth globes are a omnipresent teaching tool in many educational devices however they lack the directional orientation markers of where the sun should be oriented as a function of the months in the year.

The two-dimensional earth-moon-sun instructional model disclosed by Dahlman in U.S. Pat. No. 5,529,500 discloses a two-dimensional polar view of the earth rotatably mounted on a flat supporting base representing the celestial plane. The Dahlman disclosure suffers a number of drawbacks that may impede the learning process. In particular, the Dahlman disclosure is unduly complicated by having models of the moon and as well as shadow plates which may confuse the student. Furthermore, because the Dahlman disclosure exclusively employs a two-dimensional model of the earth, the student may not grasp the concept as easily as using a three dimensional orientation of the earth relative to the sun. In addition the Dahlman disclosure doesn't incorporate an indexing wheel for aligning a globe relative to the seasons and the months of the year.

The educational device disclosed by Moulton in U.S. Pat. No. 1,113,237 discloses a chart representing the earth's orbit with a plurality of gradations dividing the orbit into sections and having an earth ball model which may be progressively stepped along this two dimensional elliptical orbital model of the earth's orbit. The Moulton disclosure suffers a number of drawbacks that may impede the learning process. In particular, the Moulton disclosure is unduly complicated by having a large plurality of lines on the board that are likely to confuse the student. Furthermore, the student is required to move the earth ball model around the orbit that may bore the student as the student moves the model through the yearly cycle. In addition, the Moulton disclosure doesn't teach the seasonal effects brought about by the differential relative orientation of the earth to the sun due to the earth's ecliptic angle of inclination.

The calendar tellurian disclosed by Nichols in U.S. Pat. No. 615,098 discloses a board having a series of marked apertures representing the elliptical path of the earth around the sun. The board having a plurality of apertures corresponding to the number of days in the year, and a ball or globe representing the earth which can be moved into these apertures to simulate the earth's orbit around the sun. The Nichols disclosure suffers a number of drawbacks. For instance, the student is required to move the earth ball model around the orbit which may bore the student as the student moves the model through the yearly cycle. In addition, the Nichols disclosure doesn't teach the seasonal effects brought about by the differential relative orientation of the earth to the sun due to the earth's ecliptic angle of inclination.

All of the above devices are rather complicated and cumbersome, as well as, non of these above mentioned devices have an indexing wheel for aligning a globe along the ecliptic to teach the causes of the seasons as well as being able to teach the orientation of the earth relative to the sun during various months of the year. Therefore, there still exist a need for a simple, inexpensive and easily-operable device suitable for use as an educational tool to teach these concepts. This present invention provides a simple educational device that fulfills these needs.

Therefore, a need exist for a new and improved educational device that can be used to teach students the concepts of the seasonal, monthly and daily relationships associated with the differential orientations of the earth relative to the sun, so that the student may be able to visualize these concepts in a simple manner. In this respect, the educational device according to the present invention substantially departs from the conventional concepts and designs of the prior art, and in doing so provides an apparatus primarily developed for the purpose of teaching students the seasonal, monthly and daily relationships brought about by the differential orientations of the earth relative to the sun by using a simple and easy use understandable educational device.

SUMMARY OF THE INVENTION

The present invention is an educational device for use with an earth globe having ecliptic angle of inclination for teaching students the position of the earth relative to the sun through the various seasons. The educational device can also be used to teach the months of the year as well as teaching the causes of night and day. The educational device having a flat board, which represents the earth's orbital plane, and having a sun label, a plurality of season labels and a plurality of month labels affixed on the facade of the board. The educational device also has a indexer wheel pivotally mounted to the board for rotatably mounting the earth globe so that the student may be able to freely rotatably maneuver the earth globe relative to the season labels so that the student can visually grasp the causes of the seasons as the year proceeds.

In view of the foregoing disadvantages inherent in the known type educational devices now present in the prior art, the present invention provides an improved educational device which will be described subsequently in great detail, is to provide a new and improved educational device which is not anticipated, rendered obvious, suggested, or even implied by the prior art, either alone or in any combination thereof.

To attain this, the present invention essentially comprises an educational device for use with an earth globe having ecliptic angle of inclination for teaching students the position of the earth relative to the sun through the various seasons. The educational device can also be used to teach the months of the year as well as teaching the causes of night and day. The educational device having a flat board, which represents the earth's orbital plane, and having a sun label, a plurality of season labels and a plurality of month labels affixed on the facade of the board. The educational device also has a indexer wheel pivotally mounted to the board for rotatably mounting the earth globe so that the student may be able to freely rotatably maneuver the earth globe relative to the season labels so that the student can visually grasp the causes of the seasons as the year proceeds.

There has thus been outlined, rather broadly, the more important features of the invention in order that the detailed description thereof that follows may be better understood, and in order that the present contribution of the art may be better appreciated.

The invention may also include additional optional features. There are of course, additional features of the invention that will be described hereinafter and which will form the subject matter of the claims attached.

Numerous objects, features and advantages of the present invention will be readily apparent to those of ordinary skill in the art upon reading of the following detailed description of presently preferred, but nonetheless illustrative, embodiments of the present invention when taken in conjunction with the accompany drawings. In this respect, before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved educational device that has all the advantages of the prior art educational devices and none of the disadvantages.

It is another object of the present invention to provide a new and improved educational device that may be easily and efficiently manufactured and marketed.

An even further object of the present invention is to provide a new and improved educational device that has a low cost of manufacture with regard to both materials and labor, and which accordingly is then susceptible of low prices of sale to the consuming public, thereby making such multipurpose storage unit and system economically available to the buying public.

Still another object of the present invention is to provide a new educational device that provides in the apparatuses and methods of the prior art some of the advantages thererof, while simultaneously overcoming some of the disadvantages normally associated therewith.

Even still another object of the present invention is to provide a new educational device for allowing a user to visually learn about the ecliptic of the earth relative to the orbital plane of the earth around the sun . This makes it possible for the student to quickly learn about the causes of the seasons as time progresses through the year.

Still another object of the present invention is to provide the ability to illustrate the differences in the earth's exposure to sunlight at various times in the year.

Still another object of the present invention is to provide an new and improved educational device for allowing a user to visually learn the orientation of the earth surface relative to the sun as a function of the rotation of the earth. This makes it possible for the student to quickly learn about the causes of night and day. Furthermore, this makes it possible for the student to visually grasp the significance of the times of day or night relative to the earths rotation.

Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the accompany drawings and description matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various figures.

DETAILED DESCRIPTION OF THE PREFERRED EMBODIMENT

Figure 1:
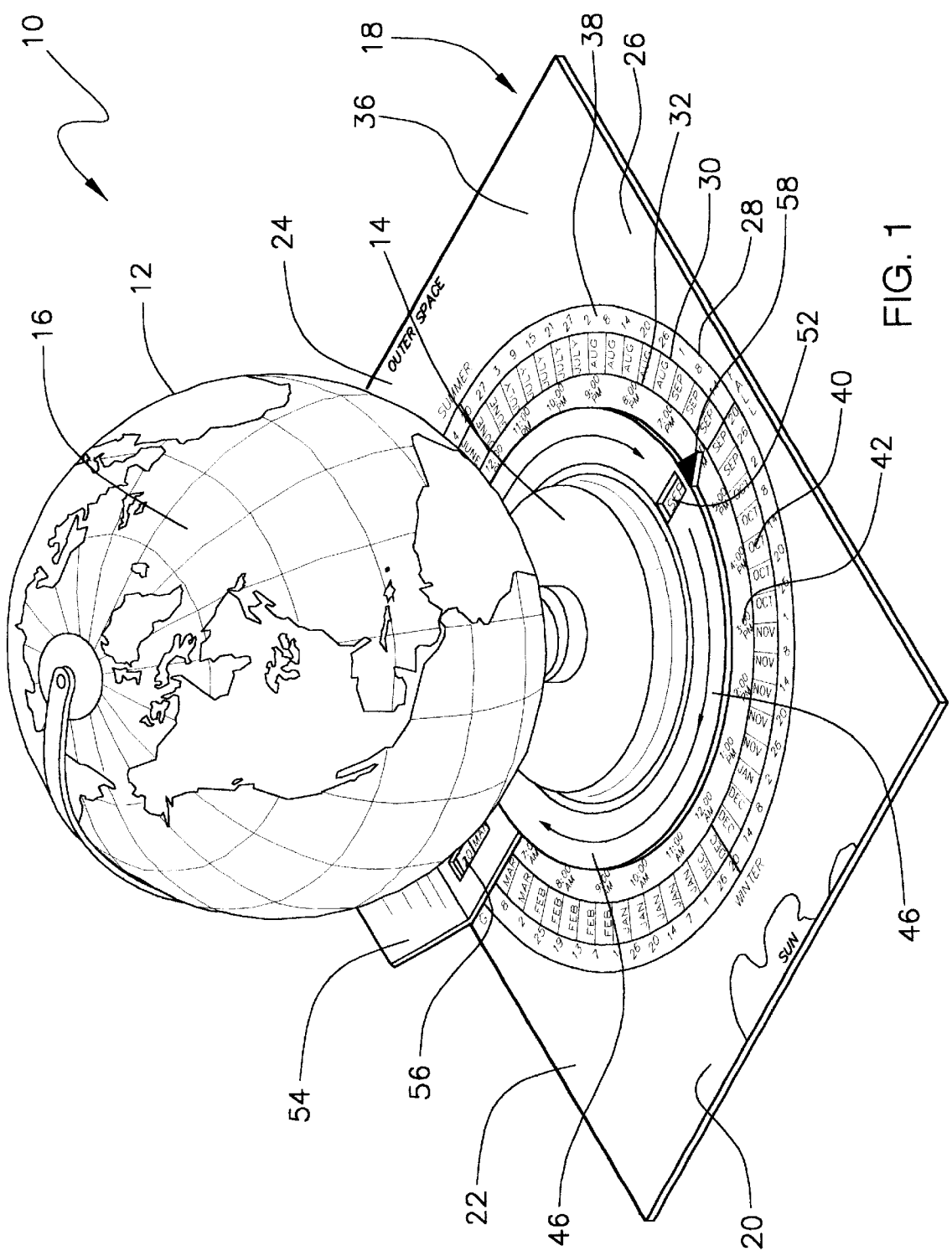
FIG. 1 is a perspective view of the preferred embodiment of the educational device constructed in accordance with the principles of the present invention.
Figure 2:
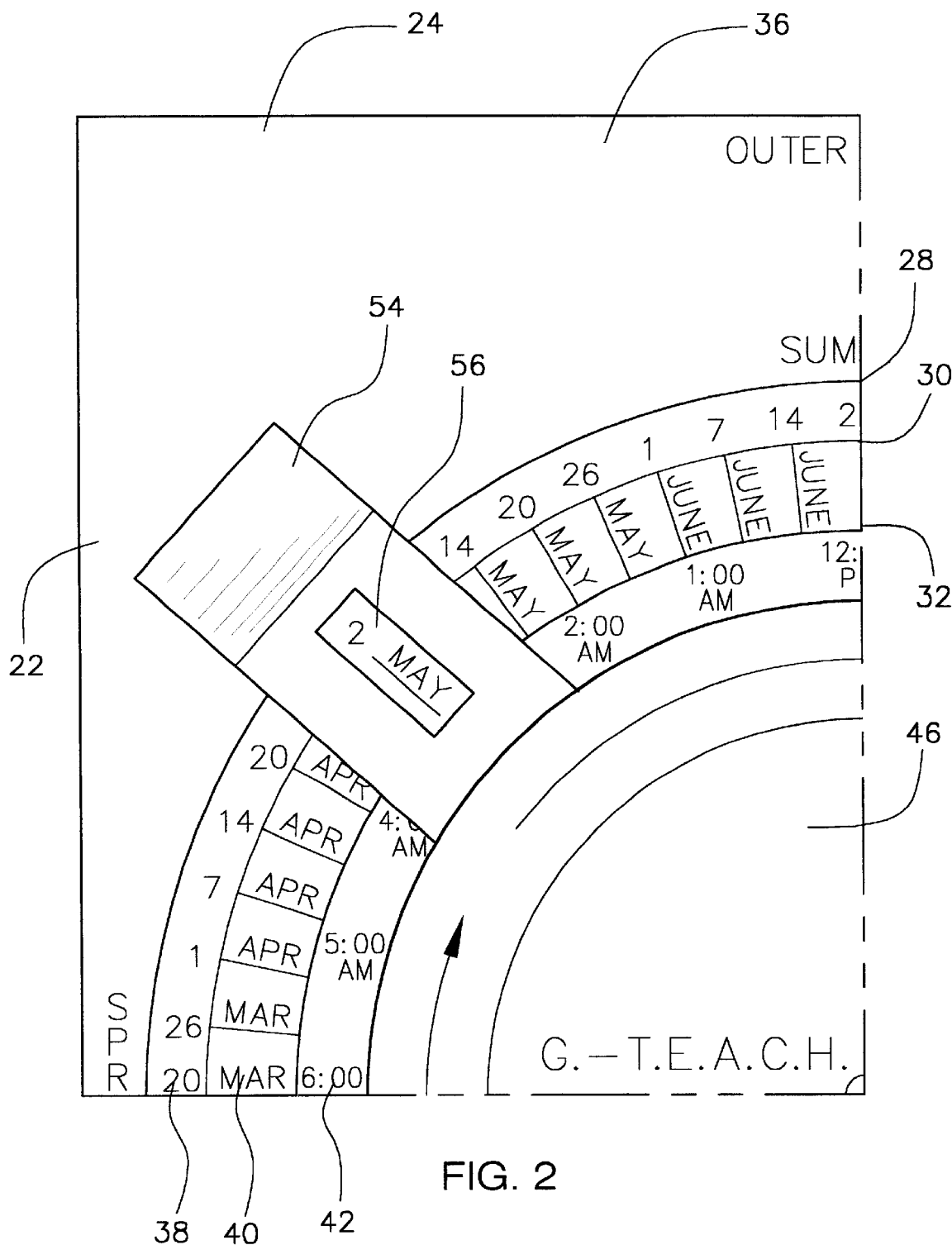
FIG. 2 is a one fourth top view of a the educational device of the present invention.
Figure 3:
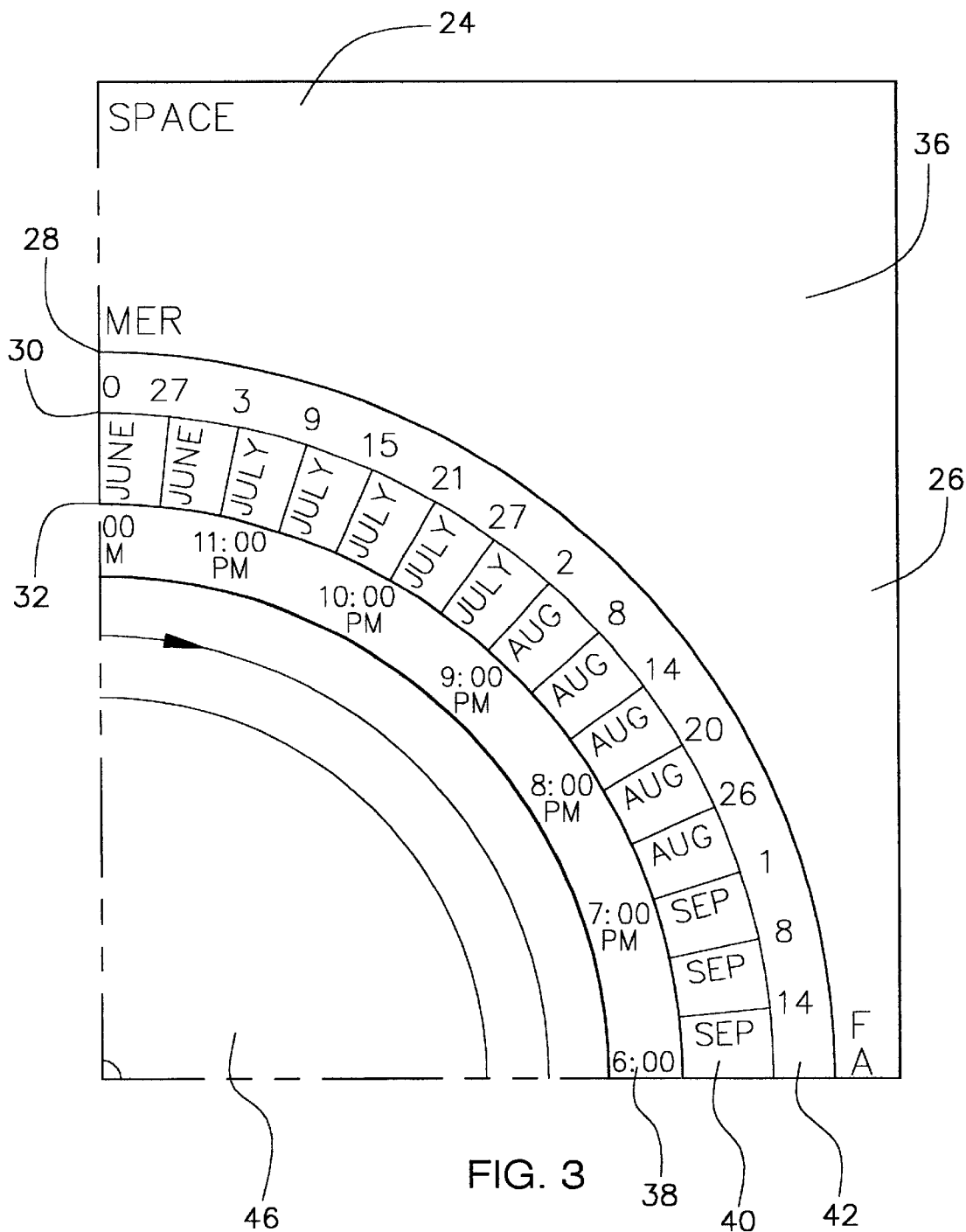
FIG. 3 is a one fourth top view of the educational device of the present invention.
Figure 4:
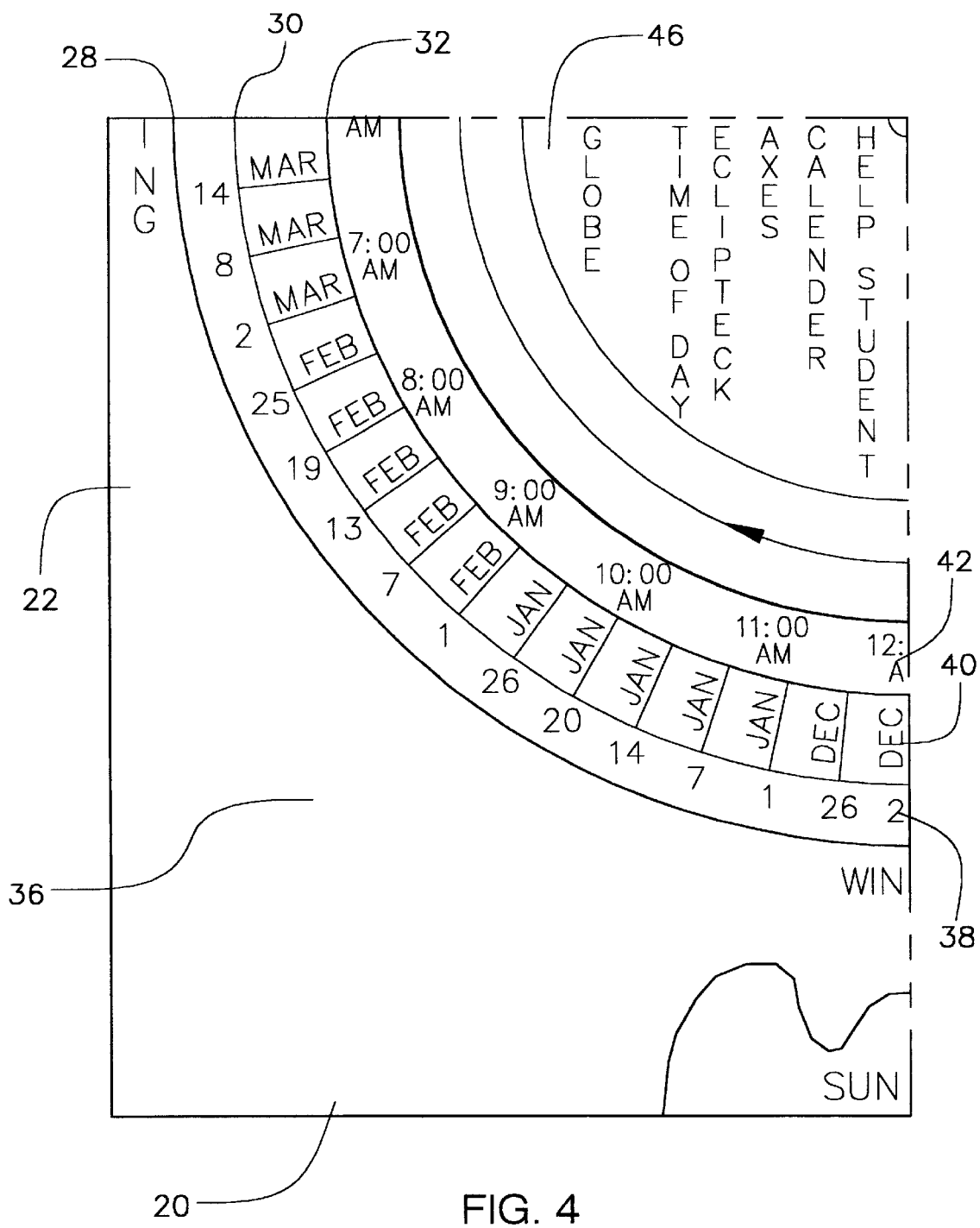
FIG. 4 is a one fourth top view of the educational device of the present invention.
Figure 5:
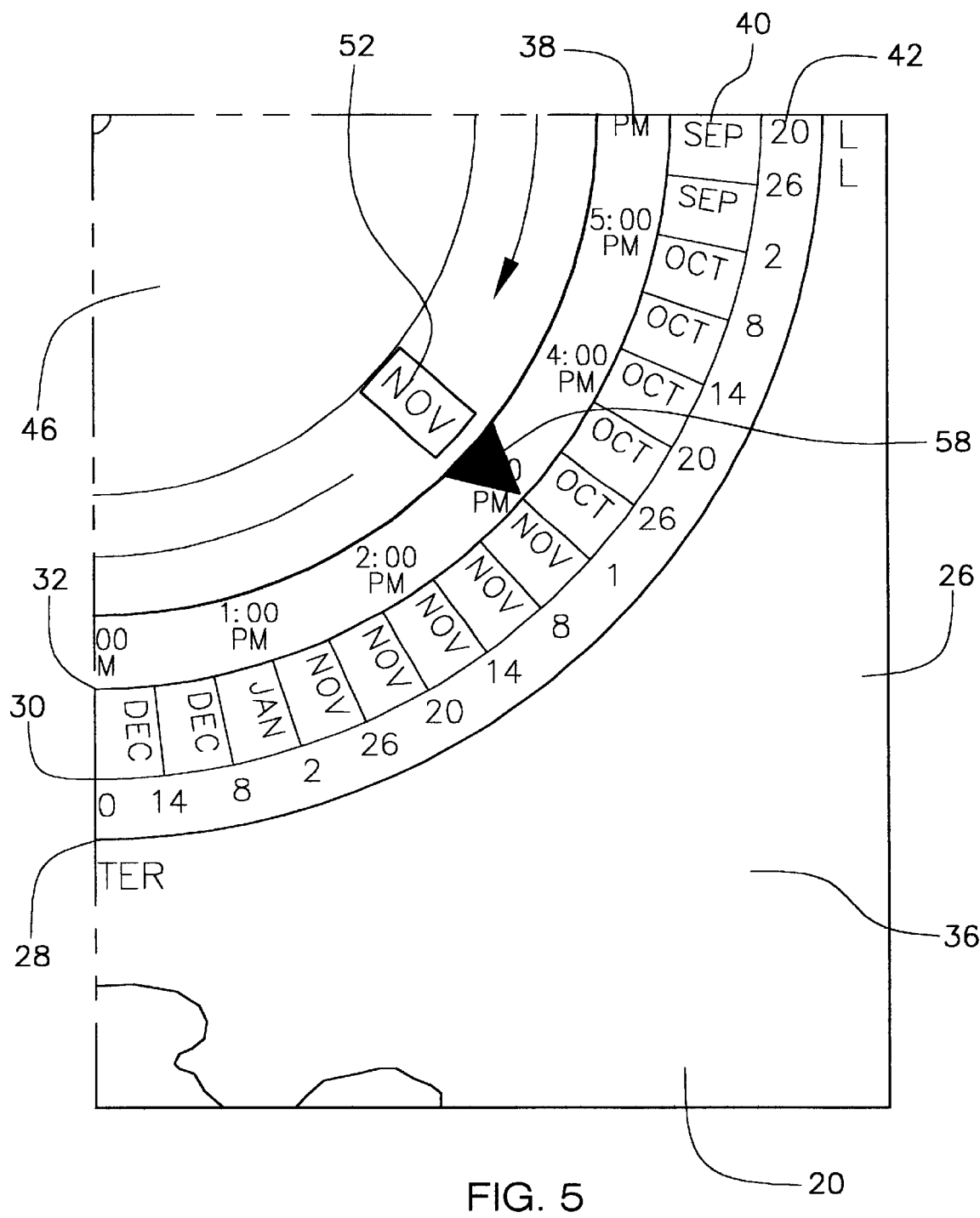
FIG. 5 is a one fourth top view of the educational device of the present invention.
Figure 6:
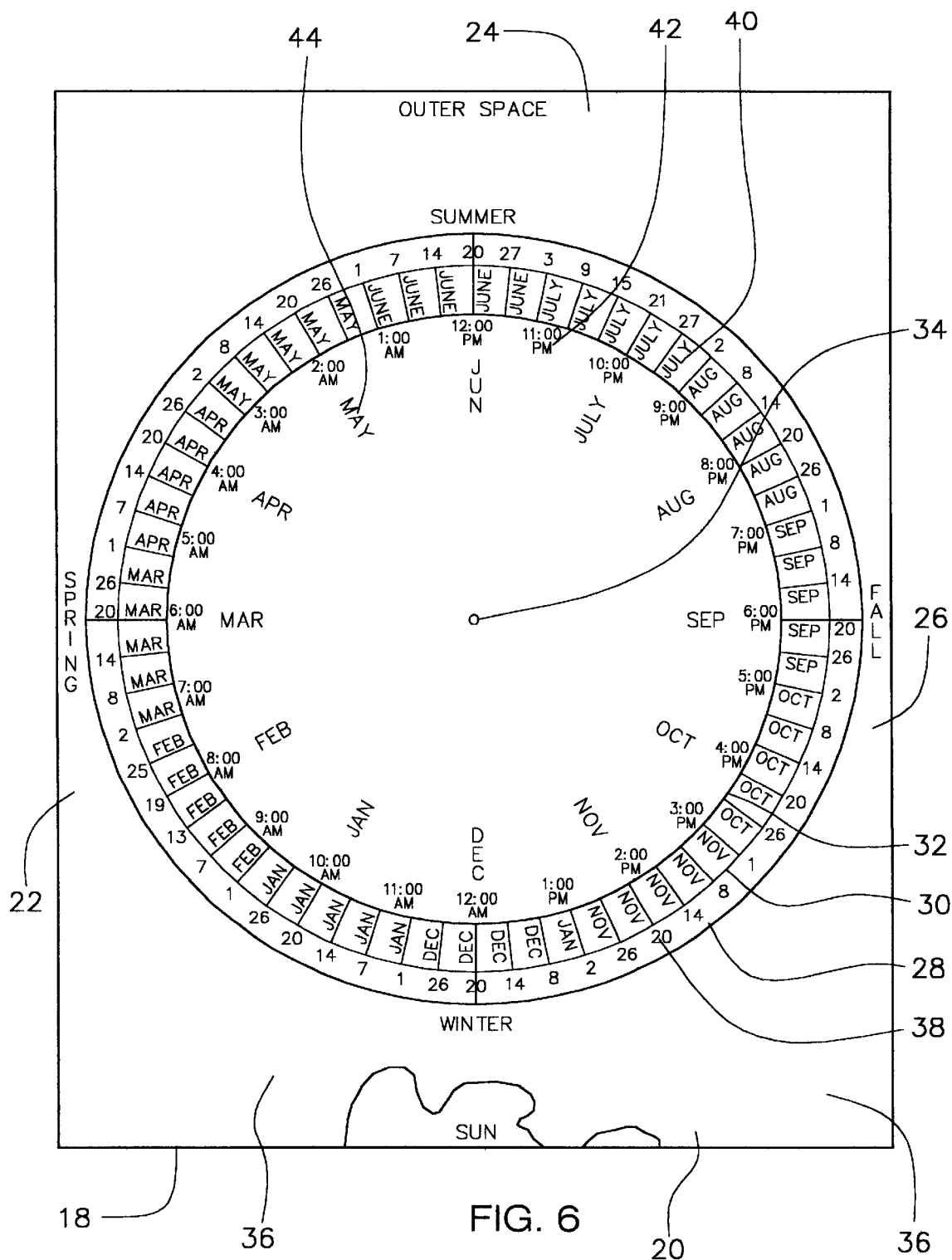
FIG. 6 is a top view of the facade of the board of the educational device of the present invention.

Referring now to the drawings, and in particular FIGS. 1 to 10 thereof, one preferred embodiment of the present invention is shown and generally designated by the reference numeral 10. An educational device 10 for use with a globe 12 having a base 14 supporting a sphere 16 which is mounted to have a rotational axis oriented at an angle of inclination substantially equal to the earth's ecliptic angle relative to the earth's orbital plane, the educational device 10 comprising: a substantially flat board 18 for representing the earth's orbital plane, the board 18 defining a generally rectangular shape having a facade 36, a centrally placed pivot hole 34, a first side 20, a second side 22, a third side 24 and fourth side 26. The facade 36 has a "SUN" label affixed substantially at the center portion edge of the first side 20. The board 18 also has a plurality of season labels affixed to the facade 36, and a first plurality of month labels affixed to the facade 36 for indicating a given month of the year the user may select.

The educational device 10 also has a pivot pin (not illustrated); and an indexer wheel 46. The indexer wheel haves a generally flat circular shaped area 48 for placement of the base 14 of the globe 12. The generally flat circular shaped area 48 having a centrally positioned pivot orifice 50 in which the pivot pin pivotally attaches the indexer wheel 46 to the board 18 by traversing through the pivot orifice 50 of the indexer wheel 46 to the pivot hole 34 of the board 18. Therefore, the indexer wheel 46 is freely rotatable around the pivot pin. Furthermore, when the globe 12 base 14 is symmetrically placed on the circular shaped area 48 the globe 12 is also freely rotatable around an axis defined by the line that traverses the pivot orifice 50 and which is perpendicular to the plane of the board 18.

The indexer wheel also has an attached fin 54 having a substantially rectangular shape. One side edge of the fin 54 is attached to a first peripheral edge portion of the flat circular shaped area 48 of the indexer wheel 46. The fin 54 having a substantially rectangular cavity 56 for allowing the user to view through the fin 54 cavity 56 to see a given month label and a given date label affixed on the board 18. At the side of the fin 54 which is furthest away from the generally flat circular shaped area 48 is angled above the plane of the generally flat circular shaped area 48 of the indexer wheel 46 for providing a handgrip for the user to rotatably orient the indexer wheel 46 to any desired rotatable angle around the pivot hole 34 of the board 18. Therefore, a user may select any given month of the year by aligning the fin 54 cavity 56 over a corresponding month label affixed on the board 18. Furthermore, the fin 54 is for allowing the user to orient the sphere 16 after placing the base 14 of the globe 12 symmetrically over the pivot orifice 50 on the circular shaped area 48 and by rotatably aligning the maximum deflection of the angle of inclination of the sphere 16 rotational axis to be pointing towards the fin 54 when the top axis pole of the sphere 16 is closest to the fin 54.

The facade 36 of the educational device 10 may optionally having a "WINTER" label affixed substantially at the center portion edge of the first side 20 above the "SUN" label. The facade 36 optionally having a "SPRING" label affixed substantially at the center portion edge of the second side 22, wherein the second side 22 is adjacent and to the left of the first side 20. The facade 36 optionally having an "OUTER SPACE" label affixed to the center portion edge of the third side 24, wherein the third side 24 is adjacent and to the left of the second side 22 and the third side 24 is opposite of the first side 20. The facade 36 optionally having a "SUMMER"label affixed to the center portion edge of the third side 24 below the "OUTER SPACE" label. The facade 36 optionally having a "FALL" label affixed to the center portion edge of the fourth side 26, wherein the fourth side 26 is adjacent to and to the left of the third side 24 and the fourth side 26 is opposite of the second side 22.

The educational device 10 may also have an optional first substantially circular circumference mark 28 concentrically affixed around the pivot hole 34. The educational device 10 also having an optional second substantially circular circumference mark 30 concentrically affixed around the pivot hole 34 and affixed within the first substantially circular circumference mark 28. The educational device 10 also having an optional a third substantially circular circumference mark 32 concentrically affixed around the pivot hole 34 and affixed within the second substantially circular circumference mark 30.

The educational device 10 may also have an optional plurality of number labels 38 affixed in the area between the first and second substantially circular circumference marks (28 and 30, respectively) for indicating a given day of the month that a user may select.

The educational device 10 may also have the first plurality of month labels 40 affixed in the area between the second and third substantially circular circumference marks (30 and 32, respectively) for indicating a given month of the year that the user may select. The first plurality of month labels 40 of the educational device 10 may be an optional selected from the group consisting of "JAN", "FEB", "MAR", "APR", "MAY", "JUNE", "JULY", "AUG", "SEP", "OCT", "NOV", and "DEC".

The educational device 10 may also optionally have a plurality of time labels 42 affixed in the area around the inside periphery edge of the third substantially circular circumference mark 32 that a user may select. This optional plurality of time labels 42 is selected from the group consisting of "12:00 AM", "1:00 AM", "2:00 AM", "3:00 AM", "4:00 AM", "5:00 AM", "6:00 AM", "7:00 AM", "8:00 AM", "9:00 AM", "10:00 AM", "11:00 AM", "12:00 PM", "1:00 PM", "2:00 PM", "3:00 PM", "4:00 PM", "5:00 PM", "6:00 PM", "7:00 PM", "8:00 PM", "9:00 PM", "10:00 PM", "1:00 PM" and "12:00 PM".

The educational device 10 may also optionally have a second plurality of month labels 44 affixed to the area around the inside periphery of the third substantially circular circumference mark. This optional second plurality of month labels 44 is affixed closer towards the pivot hole 34 than where the plurality of time labels 42 are affixed. This optional second plurality of month labels is selected form the group consisting of JAN", "FEB", "MAR", "APR", "MAY", "JUN", "JULY", "AUG", "SEP", "OCT", "NOV", and "DEC".

The generally flat circular shaped area 48 may optionally have a "G.-T.E.A.C.H." label affixed to the top surface of the generally flat circular shaped area 48. The generally flat circular shaped area 48 may also optionally have a "GLOBE" label affixed to the top surface of the generally flat circular shaped area 48. The generally flat circular shaped area 48 may optionally have a "TIME OF DAY" label affixed to the top surface of the generally flat circular shaped area 48. The generally flat circular shaped area 48 may optionally have an "ECLIPTECK" label affixed to the top surface of the generally flat circular shaped area 48. The generally flat circular shaped area 48 may optionally have an "AXES" label affixed to the top surface of the generally flat circular shaped area 48. The generally flat circular shaped area 48 may optionally have a "CALENDER" label affixed to the top surface of the generally flat circular shaped area 48. Finally, the generally flat circular shaped area 48 may optionally have a "HELP STUDENT" label affixed to the top surface of the generally flat circular shaped area 48.

The generally flat circular shaped area 48 may optionally have a substantially rectangular aperture 52 in the generally flat circular shaped area 48. This aperture 52 is for allowing a user to view a month label corresponding to a half-year out of phase month having an opposite alignment of the globe 12 placed on the indexer wheel 46 relative to the plane of the board 18 associated with a given selected month chosen by the user.

The indexer wheel 46 may optionally have an attached arrow 58 having a substantially equilateral triangular shape, where one side of the arrow 58 is attached to a second peripheral edge portion of the indexer wheel 46. This second peripheral edge portion of the indexer wheel 46 is at the opposite side of the indexer wheel 46 relative to the first peripheral edge portion of the indexer wheel 46.

Finally, the educational device 10 may also optionally have a globe 12 having a base 14 supporting a sphere 16 which is mounted to have a rotational axis oriented at an angle of inclination substantially equal to the earth's ecliptic angle relative to the earth's orbital plane.

Figure 7:
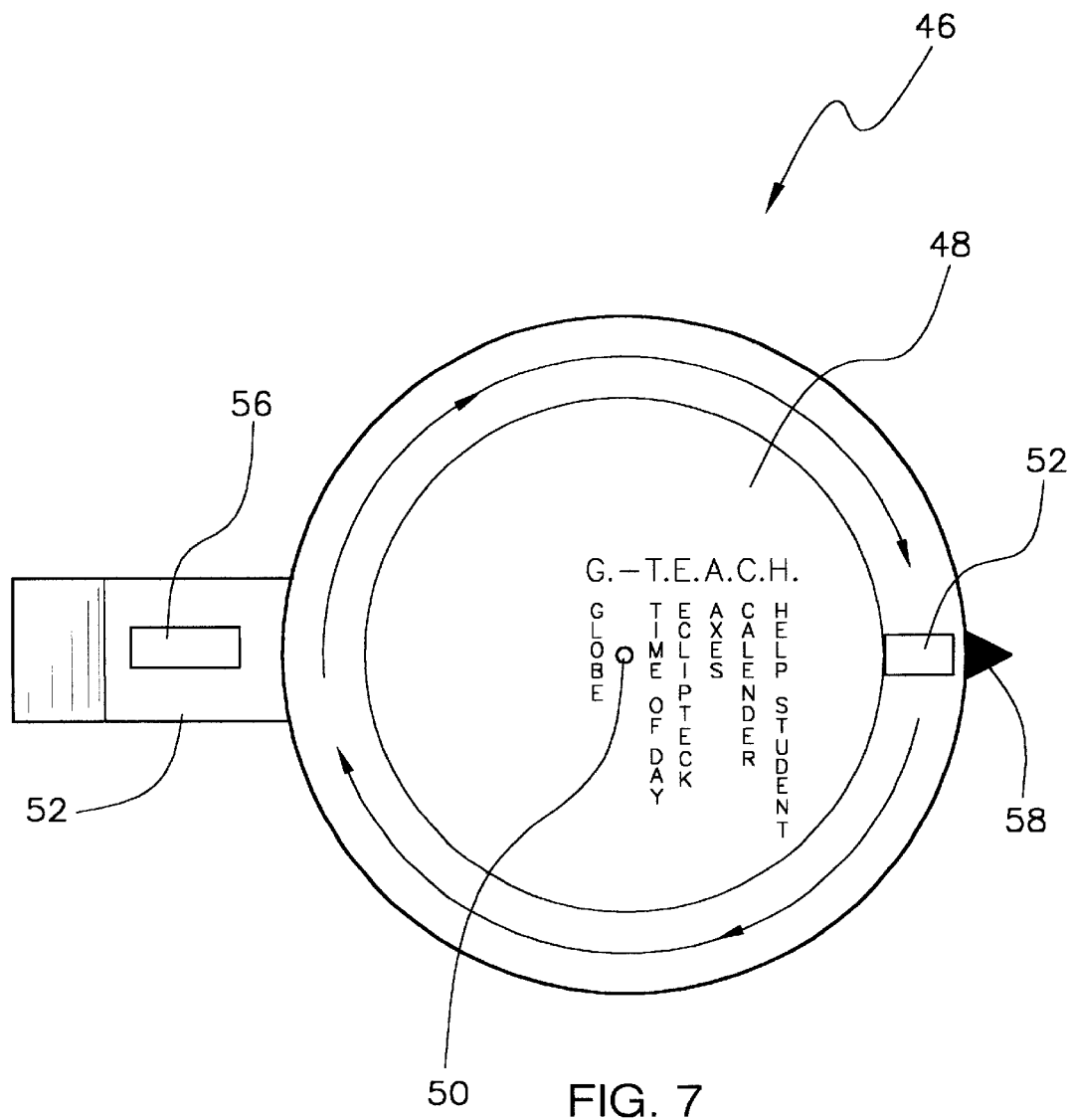
FIG. 7 is a top view of the indexing wheel of the educational device of the present invention.
Figure 8:
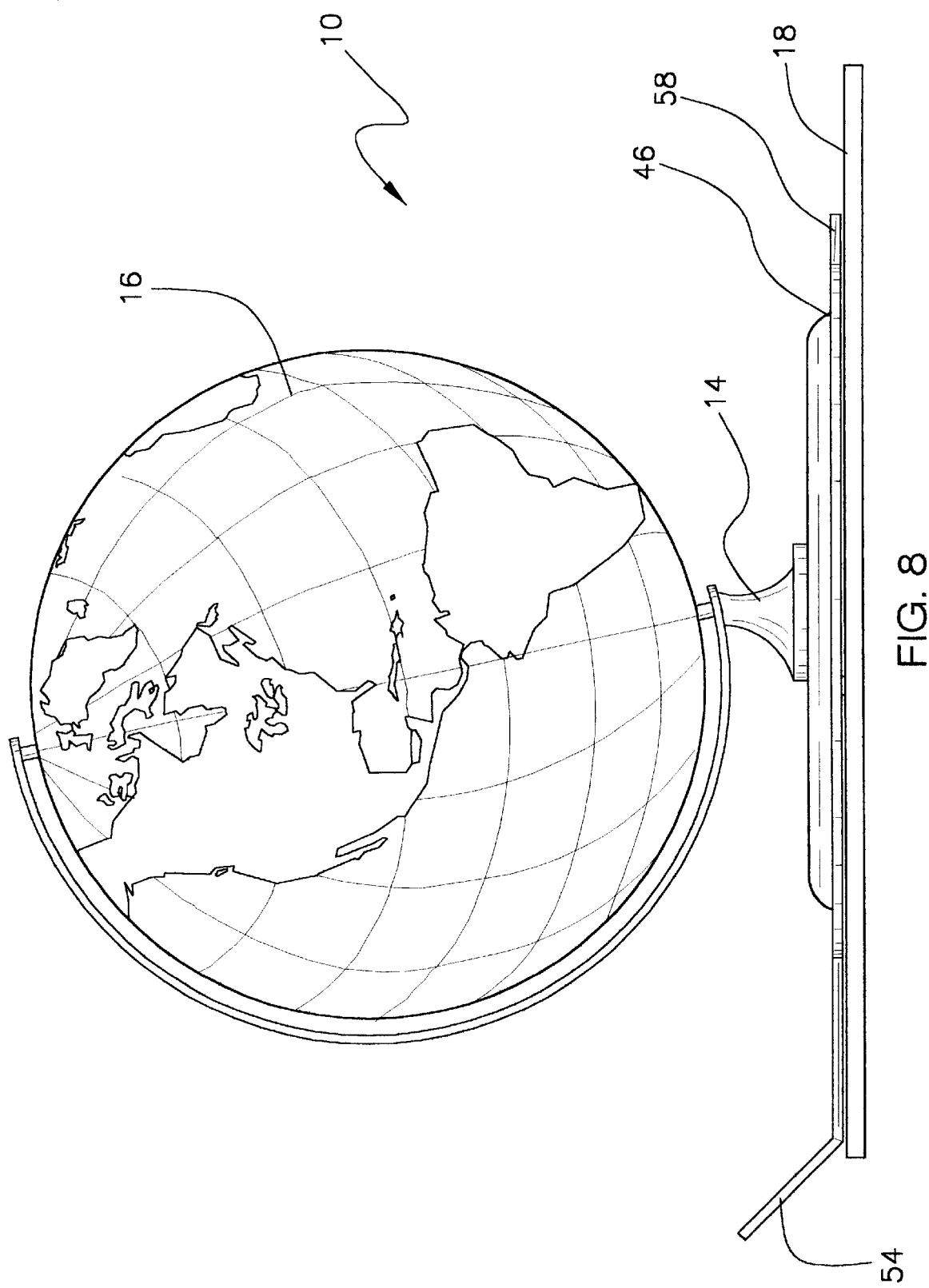
FIG. 8 is a side view of the educational device having a globe mounted onto it.

In FIG. 1, a new and improved educational device 10 of the present invention for allowing to visually learn about the orientation of the earth relative to the sun is illustrated as described above. More particularly, the educational device 10 is shown having an globe 12 mounted onto the indexing wheel 46. FIGS. 2–6 illustrate the placement of a number of optional features as discussed above that may be affixed to the facade 36 of the board 18, such as the plurality of time labels which can be used to teach the times of day as a function of the orientation of the earth relative to the sun. FIG. 7 illustrates how the number of various optional features, as discussed above, that may be affixed to the indexing wheel, such as having the "G-T.E.A.C.H." label affixed to the indexing wheel. FIG. 8 illustrates a side view of the new and improved educational device 10 having a globe 12 mounted onto the indexing wheel 46.

As to the manner of usage and operation of the present invention, the same should be apparent from the above description. Accordingly, no further discussion relating to the manner of usage and operation will be provided.

While a preferred embodiment of the educational device has been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function and manner of operation assembly and use, are deemed readily apparent and obvious to one skilled in the art, and all equivalent relationships to those illustrated in the drawings and described in the specification are intended to be encompassed by the present invention. For example, any sturdy material such as metal, plastic, cardboard, or a variety of wood may be used instead pressed cardboard. Also, the pivot pin may also be made of heavy-duty plastic, metal, metal allow, or similar material.

With respect to the above description then, it is to be realized that the optimum dimensional relationships for the parts of the invention, to include variations in size materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An educational device for use with a globe having a base supporting a sphere which is mounted to have a rotational axis oriented at an angle of inclination substantially equal to the earth's ecliptic angle relative to the earth's orbital plane, said educational device comprising:

a substantially flat board for representing the earth's orbital plane, said board defining a generally rectangular shape having a facade, a centrally placed pivot hole, a first, second, third and fourth side, wherein the facade having:

a "SUN" label affixed substantially at the center portion edge of the first side;

a plurality of season labels affixed to the facade; and a first plurality of month labels affixed to the facade for indicating a given month of the year that the user may select;

a pivot pin; and an indexer wheel having:

a generally flat circular shaped area for placement of the base of the globe;

a centrally positioned pivot orifice in said generally flat circular shaped area, wherein said pivot pin pivotally attaches said indexer wheel to said board by traversing through the pivot orifice of said indexer wheel to the pivot hole of said board, whereby said indexer wheel is freely rotatable around said pivot pin, and whereby when the globe base is symmetrically placed on the circular shaped area the globe is also freely rotatable around an axis defined by the line that traverses the pivot orifice and which is perpendicular to the plane of said board; and an attached fin having a substantially rectangular shape, wherein one side edge of said fin is attached to a first peripheral edge portion of said flat circular shaped area of said indexer wheel;

wherein said fin having a substantially rectangular cavity for allowing the user to view through said fin cavity to see a given month label affixed on said board;

wherein the side of said fin which is furthest away from said generally flat circular shaped area is angled above the plane of said generally flat circular shaped area of said indexer wheel for providing a handgrip for the user to rotatably orient said indexer wheel to any desired rotatable angle around said pivot hole of said board, whereby user may select any given month of the year by aligning the fin cavity over a corresponding month label affixed on said board; and wherein said fin is for allowing the user to orient the sphere after placing the base of the globe symmetrically over the pivot orifice on the circular shaped area and by rotatably aligning the maximum deflection of the angle of inclination of the sphere rotational axis to be pointing towards the fin when the top axis pole of the sphere is closest to the fin.

2. The educational device described in claim 1, wherein said plurality of season labels affixed to the facade comprising:

a "WINTER" label affixed substantially at the center portion edge of the first side above said "SUN" label;

a "SPRING" label affixed substantially at the center portion edge of the second side, wherein the second side is adjacent and to the left of the first side;

an "OUTER SPACE" label affixed to the center portion edge of the third side, wherein the third side is adjacent and to the left of the second side and the third side is opposite of the first side;

a "SUMMER" label affixed to the center portion edge of the third side below said "OUTER SPACE" label; and a "FALL" label affixed to the center portion edge of the fourth side, wherein the fourth side is adjacent to and to the left of the third side and the fourth side is opposite of the second side.

3. The education device described in claim 1, wherein said facade further comprising:
a first substantially circular circumference mark concentrically affixed around the pivot hole;
a second substantially circular circumference mark concentrically affixed around the pivot hole and affixed within the first substantially circular circumference mark; and
a third substantially circular circumference mark concentrically affixed around the pivot hole and affixed within the second substantially circular circumference mark.

4. The educational device described in claim 1, wherein said facade further comprising:
a plurality of number labels affixed in the area between the first and second substantially circular circumference marks for indicating a given day of the month that a user may select.

5. The educational device described in claim 1, wherein said first plurality of month labels are affixed in the area between the second and third substantially circular circumference marks for indicating a given month of the year that the user may select,
wherein the first plurality of month labels is selected from the group consisting of "JAN", "FEB", "MAR", "APR", "MAY", "JUNE", "JULY", "AUG", "SEP", "OCT", "NOV", and "DEC".

6. The educational device described in claim 1 further comprising a plurality of time labels affixed in the area around the inside periphery edge of the third substantially circular circumference mark that a user may select,
wherein the plurality of time labels is selected from the group consisting of "12:00 AM", "1:00 AM", "2:00 AM", "3:00 AM", "4:00 AM", "5:00 AM", "6:00 AM", "7:00 AM", "8:00 AM", "9:00 AM", "10:00 AM", "11:00 AM", "12:00 PM", "1:00 PM", "2:00 PM", "3:00 PM", "4:00 PM", "5:00 PM", "6:00 PM", "7:00 PM" "8:00 PM", "9:00 PM", "10:00 PM", "11 :00 PM" and "12:00 PM".

7. The educational device described in claim 6, further comprising a second plurality of month labels affixed to the area around the inside periphery of the third substantially circular circumference mark,
wherein said second plurality of month labels is affixed closer towards the pivot hole than where the plurality of time labels are affixed,
wherein said second pluality of month labels is selected form the group consisting of JAN", "FEB", "MAR", "APR", "MAY", "JUNE", "JULY", 37 AUG", "SEP", "OCT", "NOV", and "DEC".

8. The educational device described in claim 1, wherein said generally flat circular shaped area having:
a "G.-T.E.A.C.H." label affixed to the top surface of said generally flat circular shaped area;
a "GLOBE" label affixed to the top surface of said generally flat circular shaped area;
a "TIME OF DAY" label affixed to the top surface of said generally flat circular shaped area;
an "ECLIPTECK" label affixed to the top surface of said generally flat circular shaped area;
an "AXES" label affixed to the top surface of said generally flat circular shaped area;
a "CALENDER" label affixed to the top surface of said generally flat circular shaped area; and
a "HELP STUDENT" label affixed to the top surface of said generally flat circular shaped area.

9. The educational device described in claim 1 wherein said indexing wheel having a substantially rectangular aperture, said aperture for allowing a user to view a month label corresponding to a half-year out of phase month having an opposite alignment of the globe placed on said indexer wheel relative to the plane of said board associated with a given selected month chosen by the user.

10. The educational device described in claim 1, wherein said indexing wheel having an attached arrow having a substantially equilateral triangular shape,
wherein one side of said arrow is attached to a second peripheral edge portion of said indexer wheel, and
wherein said second peripheral edge portion of said indexer wheel is at the opposite side of said indexer wheel relative to said first peripheral edge portion of said indexer wheel.

11. An educational device for use with a globe having a base supporting a sphere which is mounted to have a rotational axis oriented at an angle of inclination substantially equal to the earth's ecliptic angle relative to the earth's orbital plane, said educational device comprising:
a substantially flat board for representing the earth's orbital plane, said board defining a generally rectangular shape having a facade, a centrally placed pivot hole, a first, second, third and fourth side, wherein the facade having:
a "SUN" label affixed substantially at the center portion edge of the first side;
a "WINTER" label affixed substantially at the center portion edge of the first side above said "SUN" label;
a "SPRING" label affixed substantially at the center portion edge of the second side, wherein the second side is adjacent and to the left of the first side;
an "OUTER SPACE" label affixed to the center portion edge of the third side, wherein the third side is adjacent and to the left of the second side and the third side is opposite of the first side;
a "SUMMER" label affixed to the center portion edge of the third side below said "OUTER SPACE" label;
a "FALL" label affixed to the center portion edge of the fourth side wherein the fourth side is adjacent to and to the left of the third side and the fourth side is opposite of the second side;
a first substantially circular circumference mark concentrically affixed around the pivot hole;
a second substantially circular circumference mark concentrically affixed around the pivot hole and affixed within the first substantially circular circumference mark;
a third substantially circular circumference mark concentrically affixed around the pivot hole and affixed within the second substantially circular circumference mark;
a plurality of number labels affixed in the area between the first and second substantially circular circumference marks for indicating a given day of the month that a user may select;
a first plurality of month labels affixed in the area between the second and third substantially circular circumference marks for indicating a given month of the year that the user may select,
wherein the first plurality of month labels is selected from the group consisting of "JAN", "FEB", "MAR", "APR", "MAY", "JUNE", "JULY", "AUG", "SEP", "OCT", "NOV", and "DEC";

a plurality of time labels affixed in the area around the inside periphery edge of the third substantially circular circumference mark that a user may select,
wherein the plurality of time labels is selected from the group consisting of"12:00 AM", "1:00 AM", "2:00 AM", "3:00 AM", "4:00 AM", "5:00 AM", "6:00 AM", "7:00 AM", "8:00 AM", "9:00 AM", "10:00 AM", "11:00 AM", "12:00 PM", "1:00 PM", "2:00 PM", "3:00 PM", "4:00 PM", "5:00 PM", "6:00 PM", "7:00 PM", "8:00 PM", "9:00 PM", "10:00 PM", "11:00 PM" and "12:00 PM";
a second plurality of month labels affixed to the area around the inside periphery of the third substantially circular circumference mark,
wherein said second plurality of month labels is affixed closer towards the pivot hole than where the plurality of time labels are affixed,
wherein said second plurality of month labels is selected form the group consisting of JAN", "FEB", "MAR", "APR", "MAY", "JUN", "JULY", "AUG", "SEP", "OCT", "NOV", and "DEC";
a pivot pin; and
an indexer wheel having:
a generally flat circular shaped area for placement of the base of the globe, wherein said generally flat circular shaped area having:
a "G.-T.E.A.C.H." label affixed to the top surface of said generally flat circular shaped area;
a "GLOBE" label affixed to the top surface of said generally flat circular shaped area;
a "TIME OF DAY" label affixed to the top surface of said generally flat circular shaped area;
an "ECLIPTECK" label affixed to the top surface of said generally flat circular shaped area;
an "AXES" label affixed to the top surface of said generally flat circular shaped area;
a "CALENDER" label affixed to the top surface of said generally flat circular shaped area; and
a "HELP STUDENT" label affixed to the top surface of said generally flat circular shaped area;
a centrally positioned pivot orifice in said generally flat circular shaped area,
wherein said pivot pin pivotally attaches said indexer wheel to said board by traversing through the pivot orifice of said indexer wheel to the pivot hole of said board, whereby said indexer wheel is freely rotatable around said pivot pin, whereby when the globe base is symmetrically placed on the circular shaped area the globe is also freely rotatable around an axis defined by the line that traverses the pivot orifice and which is perpendicular to the plane of said board;
a substantially rectangular aperture in said generally flat circular shaped area,
wherein said aperture for allowing a user to view a month label corresponding to a half-year out of phase month having an opposite alignment of the globe placed on said indexer wheel relative to the plane of said board associated with a given selected month chosen by the user;
an attached fin having a substantially rectangular shape,
wherein one side edge of said fin is attached to a first peripheral edge portion of said flat circular shaped area of said indexer wheel;
wherein said fin having a substantially rectangular cavity for allowing the user to view through said fin cavity to see a given month label and a given date label affixed on said board;
wherein the side of said fin which is furthest away from said generally flat circular shaped area is angled above the plane of said generally flat circular shaped area of said indexer wheel for providing a handgrip for the user to rotatably orient said indexer wheel to any desired rotatable angle around said pivot hole of said board whereby user may select any given month of the year by aligning the fin cavity over a corresponding month label affixed on said board; and
wherein said fin is for allowing the user to orient the sphere after placing the base of the globe symmetrically over the pivot orifice on the circular shaped area and by rotatably aligning the maximum deflection of the angle of inclination of the sphere rotational axis to be pointing towards the fin when the top axis pole of the sphere is closest to the fin; and
an attached arrow having a substantially equilateral triangular shape,
wherein one side of said arrow is attached to a second peripheral edge portion of said indexer wheel, and
wherein said second peripheral edge portion of said indexer wheel is at the opposite side of said indexer wheel relative to said first peripheral edge portion of said indexer wheel.

12. An educational device comprising:
a globe having a base supporting a sphere which is mounted to have a rotational axis oriented at an angle of inclination substantially equal to the earth's ecliptic angle relative to the earth's orbital plane;
a substantially flat board for representing the earth's orbital plane, said board defining a generally rectangular shape having a facade, a centrally placed pivot hole, a first, second, third and fourth side, wherein the facade having:
a "SUN" label affixed substantially at the center portion edge of the first side;
a "WINTER" label affixed substantially at the center portion edge of the first side above said "SUN" label;
a "SPRING" label affixed substantially at the center portion edge of the second side, wherein the second side is adjacent and to the left of the first side;
an "OUTER SPACE" label affixed to the center portion edge of the third side, wherein the third side is adjacent and to the left of the second side and the third side is opposite of the first side;
a "SUMMER" label affixed to the center portion edge of the third side below said "OUTER SPACE" label;
a "FALL" label affixed to the center portion edge of the fourth side, wherein the fourth side is adjacent to and to the left of the third side and the fourth side is opposite of the second side;
a first substantially circular circumference mark concentrically affixed around the pivot hole;
a second substantially circular circumference mark concentrically affixed around the pivot hole and affixed within the first substantially circular circumference mark;
a third substantially circular circumference mark concentrically affixed around the pivot hole and affixed within the second substantially circular circumference mark;
a plurality of number labels affixed in the area between the first and second substantially circular circumference marks for indicating a given day of the month that a user may select;

a first plurality of month labels affixed in the area between the second and third substantially circular circumference marks for indicating a given month of the year that the user may select,
  wherein the first plurality of month labels is selected from the group consisting of "JAN", "FEB", "MAR", "APR", "JUNE", "JULY", "AUG", "SEP", "OCT", "NOV", and "DEC";

a plurality of time labels affixed in the area around the inside periphery edge of the third substantially circular circumference mark that a user may select,
  wherein the plurality of time labels is selected from the group consisting of "12:00 AM", "1:00 AM", "2:00 AM", "3:00 AM", "4:00 AM", "5:00 AM", "6:00 AM", "7:00 AM", "8:00 AM", "9:00 AM", "10:00 AM", "11:00 AM", "12:00 PM", "1:00 PM", "2:00 PM", "3:00 PM", "4:00 PM", "5:00 PM", "6:00 PM", "7:00 PM", "8:00 PM", "9:00 PM", "10:00 PM", "11:00 PM" and "12:00 PM";

a second plurality of month labels affixed to the area around the inside periphery of the third substantially circular circumference mark,
  wherein said second plurality of month labels is affixed closer towards the pivot hole than where the plurality of time labels are affixed,
  wherein said second plurality of month labels is selected form the group consisting of JAN", "FEB", "MAR", "APR", "MAY", "JUN", "JULY", "AUG", "SEP", "OCT", "NOV", and "DEC";

in a pivot pin; and an indexer wheel having:
  a generally flat circular shaped area for placement of the base of the globe, wherein said generally flat circular shaped area having:
    a "G.-T.E.A.C.H." label affixed to the top surface of said generally flat circular shaped area;
    a "GLOBE" label affixed to the top surface of said generally flat circular shaped area;
    a "TIME OF DAY" label affixed to the top surface of said generally flat circular shaped area;
    an "ECLIPTECK" label affixed to the top surface of said generally flat circular shaped area;
    an "AXES" label affixed to the top surface of said generally flat circular shaped area;
    a "CALENDER" label affixed to the top surface of said generally flat circular shaped area; and
    a "HELP STUDENT" label affixed to the top surface of said generally flat circular shaped area;
  a centrally positioned pivot orifice in said generally flat circular shaped area,
    wherein said pivot pin pivotally attaches said indexer wheel to said board by traversing through the pivot orifice of said indexer wheel to the pivot hole of said board, whereby said indexer wheel is freely rotatable around said pivot pin, whereby when the globe base is symmetrically placed on the circular shaped area the globe is also freely rotatable around an axis defined by the line that traverses the pivot orifice and which is perpendicular to the the plane of said board;
  a substantially rectangular aperture in said generally flat circular shaped area,
    wherein said aperture for allowing a user to view a month label corresponding to a half-year out of phase month having an opposite alignment of the globe placed on said indexer wheel relative to the plane of said board associated with a given selected month chosen by the user;
  an attached fin having a substantially rectangular shape,
    wherein one side edge of said fin is attached to a first peripheral edge portion of said flat circular shaped area of said indexer wheel;
    wherein said fin having a substantially rectangular cavity for allowing the user to view through said fin cavity to see a given month label and a given date label affixed on said board;
    wherein the side of said fin which is furthest away from said generally flat circular shaped area is angled above the plane of said generally flat circular shaped area of said indexer wheel for providing a handgrip for the user to rotatably orient said indexer wheel to any desired rotatable angle around said pivot hole of said board whereby user may select any given month of the year by aligning the fin cavity over a corresponding month label affixed on said board; and
    wherein said fin is for allowing the user to orient the sphere after placing the base of the globe symmetrically over the pivot orifice on the circular shaped area and by rotatably aligning the maximum deflection of the angle of inclination of the sphere rotational axis to be pointing towards the fin when the top axis pole of the sphere is closest to the fin; and
  an attached arrow having a substantially equilateral triangular shape,
    wherein one side of said arrow is attached to a second peripheral edge portion of said indexer wheel, and
    wherein said second peripheral edge portion of said indexer wheel is at the opposite side of said indexer wheel relative to said first peripheral edge portion of said indexer wheel.

* * * * *